United States Patent [19]

Shemtov

[11] 4,368,997
[45] Jan. 18, 1983

[54] PIVOT JOINT

[75] Inventor: Sami Shemtov, Brooklyn, N.Y.

[73] Assignee: Berger Industries, Inc., Maspeth, N.Y.

[21] Appl. No.: 248,989

[22] Filed: Mar. 30, 1981

[51] Int. Cl.³ .............................. F16B 7/06; F16B 7/10
[52] U.S. Cl. ...................................... 403/59; 403/119; 403/151; 403/103; 248/286
[58] Field of Search ................ 403/66, 84, 110, 386, 403/119, 59, 148, 151; 248/286, 285

[56] References Cited

U.S. PATENT DOCUMENTS

| 505,584 | 9/1893 | White | 403/66 |
| 2,124,006 | 7/1938 | Parker | 403/103 X |
| 3,357,726 | 12/1967 | Gabrielson | 403/59 |
| 3,810,462 | 5/1974 | Szpur | 403/59 X |
| 3,961,854 | 6/1976 | Jaquet | 403/59 |

FOREIGN PATENT DOCUMENTS

| 1167058 | 7/1958 | France | 403/103 |
| 571206 | 12/1957 | Italy | 403/103 |
| 563093 | 7/1944 | United Kingdom | 403/59 |

Primary Examiner—Wayne L. Shedd
Attorney, Agent, or Firm—Goodman & Teitelbaum

[57] ABSTRACT

A pivot joint having a housing member with a pair of opposing coaxially aligned bores in communication with an elongated channel transverse to the bores. A cylindrical member extends across the channel and rotates within the bores. The cylindrical member is longitudinally split to form a pair of clamping sections having a double-D configuration. A passageway is formed through the cylindrical member transverse to its axis and spanning across the split to define opposing concave bearing surfaces for receiving an axially adjustable rod therethrough. A locking clamp extends into the housing for locking the clamp sections together in a desired rotational orientation within the bores, thereby securely clamping the rod in a desired angular orientation as well as in a desired axial extension.

12 Claims, 12 Drawing Figures

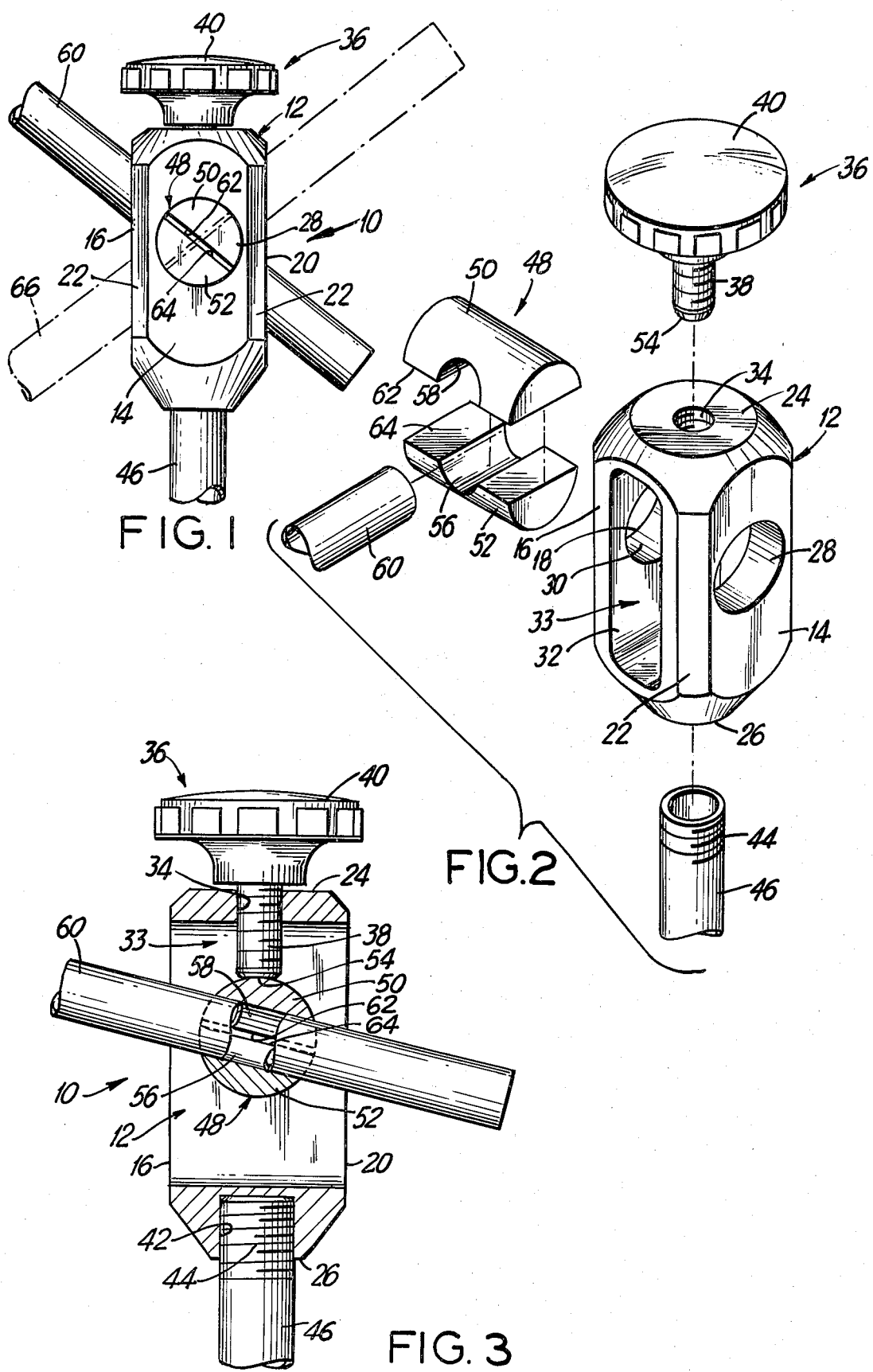

PIVOT JOINT

BACKGROUND OF THE INVENTION

This invention relates to a pivot joint and more particularly to a joint which permits angular and axial extension adjustment of a rod with respect to a support post.

Various devices are supported from a rod which in turn extends from a support post. However, adjustment of the rod with respect to the post is frequently required. For example, a mike boom supports a microphone at one end while the other end if coupled to a support post. However, it is frequently necessary to adjust the axial extension of the mike boom, or the angular position of the mike boom with respect to the support post.

Similarly, lighting fixtures are regularly formed of various rod sections. One such rod section usually supports the lamp socket and the other end thereof is coupled to a mounting or support post. However, these types of fixtures should permit adjustment of the lamp by modifying the position of the rod with respect to the mounting post. Such adjustments usually necessitate angular repositioning of the rod with respect to the mounting post or modifying the axial extension of the rod with respect to the mounting post.

Once the above mentioned adjustment is achieved, however, it is desired to securably clamp the rod into position so that it will support the mike, lamp, or other apparatus held at the end of the rod, without movement or slippage.

It is accordingly desirable to have a suitable joint which will readily permit both angular orientation of a rod with respect to a mounting post, as well as permitting axial adjustment of the extension of the rod with respect to such mounting post. At the same time, the joint should provide proper clamping of the rod in place once the adjustment is achieved so that the rod will be retained at the desired orientation and extension.

SUMMARY OF THE INVENTION

Accordingly, it is an object of the present invention to provide a pivot joint which achieves the aforementioned desired results.

Another object of the present invention is to provide a pivot joint which permits both the angular orientation as well as the adjustment of the axial extension of a rod with respect to a mounting post.

Still another object of the present invention is to provide a pivot joint which can permit angular orientation of a rod with respect to a mounting post, including coaxial alignment of the rod and post.

Yet a further object of the present invention is to provide a pivot joint which permits angular orientation of a rod with respect to a mounting post, and also provides for coaxially positioning the rod with respect to the post so that the rod can be telescopically inserted into the post to provide a coaxial extension of the post.

A further object of the present invention is to provide a pivot joint which permits the angular adjustment as well as coaxial extension of a rod with respect to a mounting post, and wherein the mounting post can be either tubular or solid.

Another object of the present invention is to provide a pivot joint which permits angular orientation of a rod with respect to a mounting post, and permits coaxial alignment of the rod with respect to the post, and further includes an offset connector for use in conjunction with a solid mounting post.

Briefly, in accordance with the present invention, there is provided a pivot joint formed of a hollow housing having a pair of opposing coaxially aligned bores formed through two opposing walls of the housing and a pair of opposing aligned elongated channels transverse to said bores. A cylindrical member is rotatably positioned in said bores. The cylindrical member is longitudinally split to form a pair of clamping sections having a double-D configuration. A passageway is formed through the cylindrical member transverse to its axis and spanning across the split, to thereby define opposing bearing surfaces for receiving the rod therethrough. A locking clamp extends into the housing for locking the clamping sections together in a desired rotational orientation within the bores. In this manner, the extension of the rod can be axially adjusted within the passageway, and its angular orientation can be properly positioned by rotating the cylindrical members within the bore. The locking member then holds the rod in the desired angular orientation and axial extension.

In one embodiment of the present invention, the housing is formed of a unitary structure with the channels being defined by elongated slots formed through a pair of opposing side walls of the housing. In another embodiment of the invention, the housing is formed of two members, a lower U-shaped clevis member and an upper U-shaped yoke member. The channels are defined by the spaces between the legs of the clevis member and accordingly are open ended. Pivot means is provided for permitting the yoke member to pivot with respect to the clevis member. In this manner the yoke member can move out of axial alignment with the clevis member to permit the rod to be coaxially oriented with the clevis member. If the mounting post is tubular, the rod can then be telescopically inserted into the mounting post to form an extension thereof. If a solid mounting post is utilized, the housing can include an offset arm for coupling onto the mounting post, or alternately, a connector can be provided for laterally spacing the solid mounting post from the rod.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 shows an elevational view of the pivot joint in accordance with a first embodiment of the present invention;

FIG. 2 is an exploded perspective view of the various parts forming the pivot joint of the first embodiment;

FIG. 3 is an elevational view, partially broken away and partially sectioned, of the first embodiment of the present invention;

In the various figures of the drawing, like reference characters designate like parts.

DETAILED DESCRIPTION OF THE PREFERRED EMBODIMENT

Figure 4:
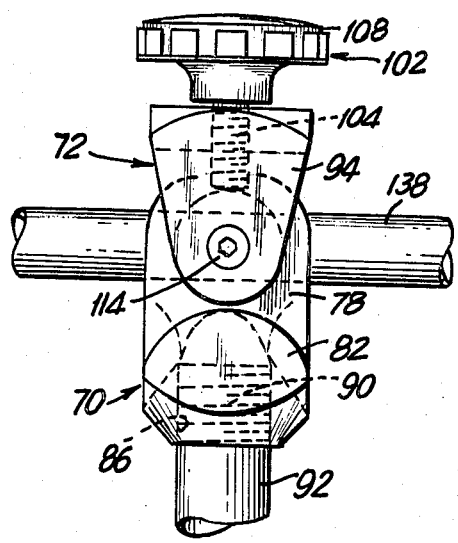
FIG. 4 is an elevational view of a second embodiment of the pivot joint in accordance with the present invention.

Referring now to FIGS. 1-3, the pivot joint in accordance with a first embodiment of the present invention is shown generally at 10 and includes a housing, shown generally at 12, formed of a unitary member. The housing 12 is hollow with four opposing flat surfaces 14, 16, 18 and 20. The edges interconnecting the side faces are beveled as shown at 22. The upper portion includes a flat top surface 24 and the lower portion includes a flat bottom surface 26.

In the first pair of opposing surfaces 14, 18, as shown in FIG. 2, there are formed coaxially aligned bores 28, 30. In the other opposing surfaces 16, 20, there are formed elongated slots 32 which are aligned to form a channel or opening 33 through the housing 12 which is in communication with and transverse to the bores 28, 30.

A threaded hole 34 extends through the top surface 24 to receive a clamping member 36 which includes a threaded stem 38 terminating in an upper knob 40. In the bottom surface 26 there is provided a threaded hole 42 which accommodates the threaded upper end portion 44 of a mounting post 46 which supports the pivot joint 10. The hole 42 is closed at its end so that the hole 42 does not extend into the opening 33.

A cylindrical member, shown generally at 48, is split longitudinally along its axis to form a pair of upper and lower clamping sections 50, 52 having a double-D configuration. The upper surface of the clamping member 50 forms a bearing surface upon which the lower end 54 of the threaded stem 38 of the clamping member can abut. A hole is formed transversely through the cylindrical member 48, spanning across the split sections 50, 52 so that a lower half of the hole forms a lower concave bearing surface 56 while the upper half of the hole forms an upper concave bearing surface 58. The bearing surfaces 56, 58 clamp onto a cylindrical rod 60 which is to be securely held in place by means of the joint 10. The opposing flat surfaces 62, 64 face each other on the inside of the double-D shaped clamping sections 50, 52.

When assembled, the clamping sections 50, 52 are placed adjacent to each other to form the cylindrical member 48, and slid into the aligned bores 28, 30. The bores 28, 30 are made slightly larger than the circumference of the cylindrical member 48 to permit a slight spacing apart of the two sections 50, 52 so as to hold the cylindrical rod 60 against the bearings surfaces 56, 58. The length of sections 50, 52 is equal to the distance between the opposing surfaces 14 and 18 so that the cylindrical member 48 is rotatively held in the bores 28, 30.

The rod 60 is then slid into the passageway defined between the bearing surfaces 56, 58 and its axial extension is adjusted. As can be seen in FIG. 1, both the axial extension and the angular orientation shown in the solid lines of the rod 60 differ from that shown in the dotted lines shown at 66. The angular orientation of the rod 60 can then be adjusted by rotating the rod 60 together with the cylindrical member 48 within the bores 28, 30 until the rod is suitably positioned. Thus, with the axial extension adjusted and the angular orientation properly positioned, the clamping member 36 is then tightened, as shown in FIG. 3, so as to clamp the section 50 in place to prevent rotation of the rod 60 and the member 48, and to sandwich the rod 60 between the two double-D sections 50, 52, to prevent axial movement of the rod 60 relative to the member 48 for securely retaining the rod 60 in its selected position. The rod 60 and the joint 10 are supported by the mounting post 46 which has been inserted into the bottom threaded hole 26.

Utilizing the pivot joint as described, the rod 60 can be suitably positioned with its angular orientation as well as its axial extension both being adjusted with respect to the mounting post. The single clamping member 36 is utilized for both the angular orientation as well as the axial adjustment of the rod 60. This use of a single locking clamp for both types of adjustments facilitates a simple and quick reorientation and readjustment of the rod.

Should it be desired to change the position of the rod, all that is required is to loosen the single clamping member 36, which will permit both angular orientation as well as axial adjustment of the rod, and then tighten the clamping member 36 when the rod is in the new selected position.

Figure 8:
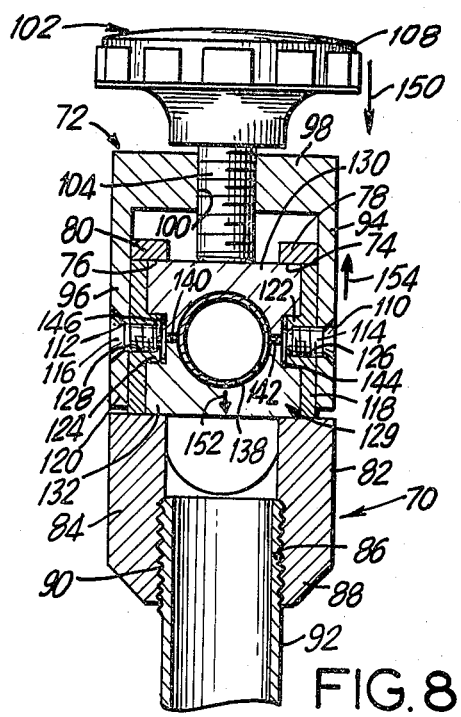
FIG. 8 is a sectional view taken through the pivot joint in the position shown in FIG. 4.
Figure 9:
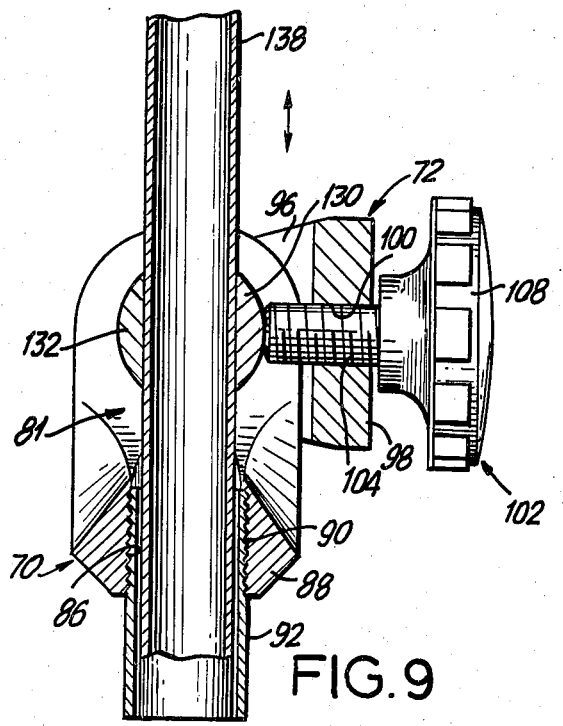
FIG. 9 is a sectional view taken through the pivot joint in the position shown in FIG. 6.

Referring now to FIGS. 4-9, a modified version of the previously described pivot joint is shown. As can best be seen in FIG. 7, the pivot joint is formed of a lower section 70 in the form of a U-shaped clevis, and an upper U-shaped yoke section 72. The lower clevis 70 includes a pair of coaxially aligned bores 74, 76 formed in the distal end portions of its legs 78, 80. The lateral space between the legs 78, 80 define a channel or opening 81 which is transverse to the bores 74, 76. It should be noted that because of the shape of the clevis, the channel 81 is open ended at its top. Outwardly extending bosses 82, 84 are formed on the lower parts of the legs 78, 80 beneath the bores 74, 76 and form limits to the pivotal movement of the yoke section 72, as can best be seen in FIG. 6. A threaded hole 86 axially extends through the lower bight portion 88 of the clevis and is available for receiving the upper threaded end 90 of a mounting post 92, as best shown in FIGS. 8 and 9.

The upper yoke section 72 includes a pair of downwardly depending legs 94, 96 interconnected by the bight section 98. A threaded hole 100 is formed through the bight section 98 for receiving the locking member 102. The locking member includes an externally threaded stem portion 104 terminating at a lower surface 106, the stem portion 104 having an upper knob 108 thereon. Aligned countersunk clearance holes 110, 112 are formed adjacent the distal end portions of the legs 94, 96 for receiving passage therethrough of the pivot screws 114, 116.

Bearing plates 118, 120 are provided, which are of a size so as to fit into the bores 74, 76 of the clevis 70. Inwardly extending from the face of the bearing plates are pintels 122, 124 which have threaded holes 126, 128 extending therethrough, in which the pivot screws 114, 116 can thread.

A cylindrical member 129 is split along its longitudinal axis to define a pair of upper and lower clamping sections 130, 132 having a double-D configuration. A transverse hole is formed therethrough which spans across the longitudinal split and defines an upper concave bearing surface 134 and a lower concave bearing surface 136 which together clamp around a cylindrical rod 138 which is to be positioned within the pivot joint. The opposing flats 140, 142 face each other on the inside of the double-D clamping sections 130, 132.

Axially extending inwardly from each end face of the cylindrical member 129 are sockets 144, 146. The sockets 144, 146 span scross the longitudinal split and receive the respective pintels 122, 124 extending from the bearing plates 118, 120 to permit rotation of the cylindrical member 129 thereabout.

When assembled, the clevis 70 is secured on the mounting post 92 so that the threaded end 92 is threaded into the threaded hole 86 in the bight portion 88 of the clevis, and the cylindrical double-D sections 130, 132 are inserted within the coaxially aligned bores 74, 76 with the bearing plates 118, 120 being disposed at opposite ends thereof. The bearing plates 118, 120 are inserted so that the pintels 122, 124 are received into the respective sockets 144, 146 at the opposite ends of the cylindrical double-D sections 130, 132. As can best be seen in FIG. 8, the width of the bores 74, 76 and the distance between the bores are such that the bearing plates only extend partially through the bores, while the cylindrical double-D sections fill the remainder of the bores. In this way, the double-D sections can rotate within the bores 74, 76 and the bearing plates are held within the outer parts of the bores and are flush with the outer surfaces of the legs 78, 80 of the clevis 70.

The yoke 72 is mounted with its legs overlying the bearing plates 118, 120 so that the pivot screws 114, 116 pass through the clearance holes 110, 112 in the legs of the yoke, the pivot screws 114, 116 being threaded into the holes 126, 128 in the pintels 122, 124 of the bearing plates to secure the bearing plates to the respective legs of the yoke 72. The yoke 72 will then be pivotal with respect to the clevis 70, and at the same time the double-D cylindrical sections 130, 132 will be rotatable within the bores 74, 76. The locking member 102 is then threaded into the threaded hole 100 so that the pivot joint can be locked in place.

With the pivot joint assembled, the rod 138 can be suitably positioned within the pivot joint by loosening the single locking member 102. The rod 138 is inserted between the bearing surfaces 134, 136 within the double-D clamping sections 130, 132, whereby the axial extension of the rod can be suitably adjusted. By moving the rod angularly upwardly or downwardly, the double-D sections will rotate within the bores and the angular orientation of the rod can thereby be adjusted. The locking member 102 is then tightened to lock the rod in place.

Figure 5:
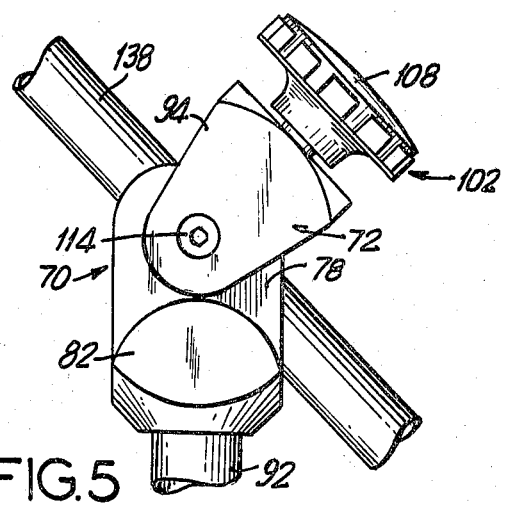
FIGS. 5 and 6 both show elevational views and illustrate the various positions of the pivot joint of the second embodiment.

Utilizing the embodiment now described, the yoke can be pivoted to various positions in order to gain greater angular swing for the rod 138. As is noted in FIG. 4, the rod 138 can be horizontally positioned with respect to the mounting post 92, the yoke 72 being coaxially retained with respect to the clevis. However, should it be desired to further angularly rotate the rod as shown in FIG. 5, the yoke 72 can be moved out of its vertical position with respect to the mounting post 92, and can be angularly oriented. Preferably, it is desired to retain the yoke 72 in a position substantially perpendicular to the rod 138 in order to facilitate manipulation of the locking member 102, though this perpendicular arrangement is not required by the construction of the pivot joint.

Figure 6:
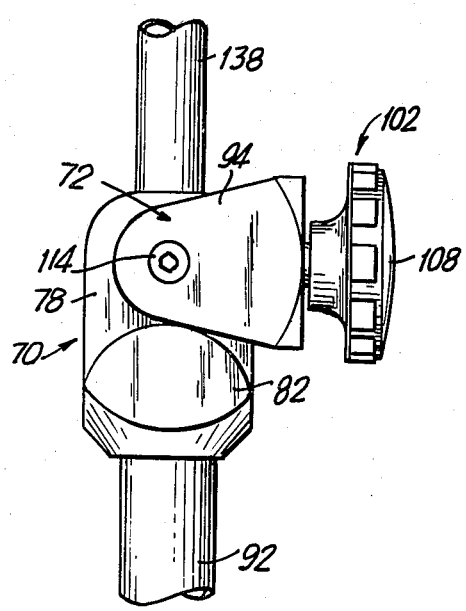
Figure 7:
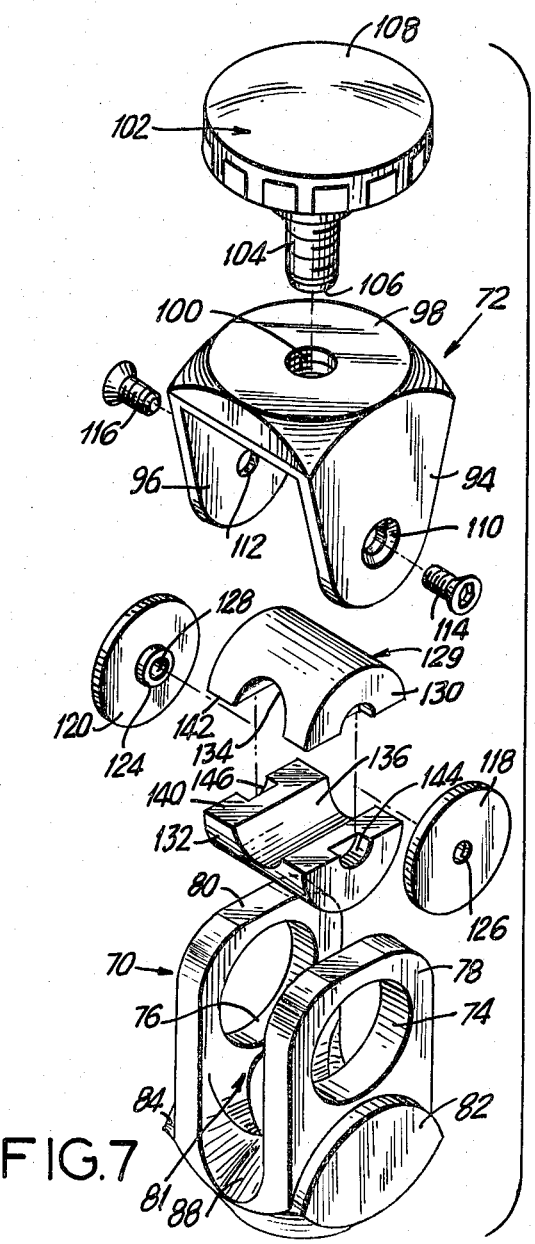
FIG. 7 is an exploded perspective view showing the various parts of the pivot joint of the second embodiment.

Should it be desired, the rod 138 can actually be axially oriented so that it is coaxial with the mounting post 92, as shown in FIGS. 6 and 9. In this case, the yoke 72 is positioned at right angles with respect to the clevis 70. Since the threaded hole 86 in the bottom of the clevis passes entirely through the bight portion of the clevis, and the mounting post 92 is tubular, the rod 138 can extend downwardly into the tubular post 92 and be telescopically received therein, as is shown in FIG. 9. In this way, the pivot joint can be utilized as a connector for extending the mounting post, and the rod 138 can be used as an extension. Since the rod 138 extends telescopically into the post 92, it gains greater stability and prevents the possibility of bending with respect to the mounting post 92.

It should be noted that the single locking member 102 is utilized to lock all the parts into place. Specifically, the single locking member will lock the rod 138 in its desired angular orientation as well as in its axial extension. Accordingly, the locking member 102 serves to lock the yoke 72 suitably in place with respect to the clevis 70. As a result, quick adjustment can be made of the rod 138 by means of the single locking member 102, so that the rod's position both angularly and axially can be adjusted.

With reference now to FIG. 8, it will be noted that by tightening the locking member 102, all the parts are locked together. Specifically, as shown by the arrow 150 adjacent the knob 108, as the knob is tightened, the threaded stem portion 104 moves downwardly so that the lower surface 106 exerts a force onto the two clamping sections 130, 132 which also tend to move downwardly as shown by the arrow 152. This action locks the two double-D sections 130, 132 against the rod 138 and presses them against the bottom surface of the bores 74, 76. At the same time, the downward movement of the locking member 102 tends to force the yoke 72 upwardly, as shown by the arrow 154. Because the yoke 72 is connected to the bearing plates, the bearing plates will tend to move upwardly so that their upper surfaces press against the upper surface of the bores 74, 76. In this way, all of the parts are locked in place, and specifically the single locking member 102 will lock the clamping sections, the yoke, the clevis and the rod 138 all into place to prevent any orientation or displacement of these parts. All this is achieved by means of the single locking member which holds the joint securely tightened and also permits both angular and axial adjustment of the rod.

Figure 10:
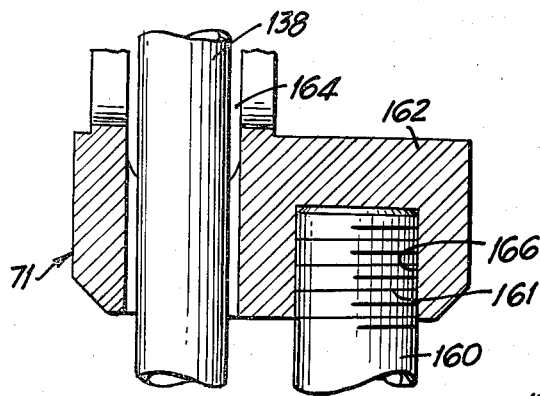
FIG. 10 is a partial elevational sectional view showing an offset arrangement in accordance with another embodiment of the present invention.

In many cases, it is desired to vertically position the rod 138 with the lower end of the rod downwardly extending from the pivot joint. However, the mounting post may not be a tubular member but may rather be a solid post. As a result, it will not be possible to extend the rod 138 into the solid mounting post, as was shown in FIG. 9. Accordingly, it is possible to modify the clevis slightly, as shown in FIG. 10. Accordingly, the clevis is modified to include a bottom portion 71 having an offset arm 162. A clearance hole 164 for receiving the post 138 extends entirely through the bottom portion 71, whereby the mounting post 160 is not connected directly therebeneath, but instead, the threaded end 161 of the mounting post 160 fits into a threaded hole 166 formed in the offset arm 162. As a result, the rod 138 is laterally spaced from the mounting post 160, although they are both parallel to each other. This arrangement permits secure retention onto the mounting post 160, and at the same time permits the rod 138 to be vertically oriented and have its lower end extend downwardly for greater stability.

Figure 11:
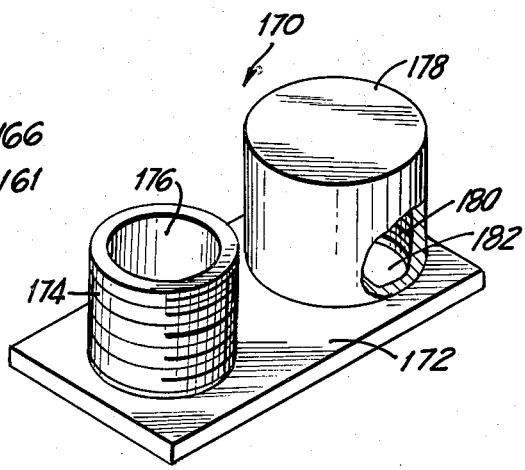
FIG. 11 is a perspective view of a connector which can be utilized in conjunction with the pivot joint.
Figure 12:
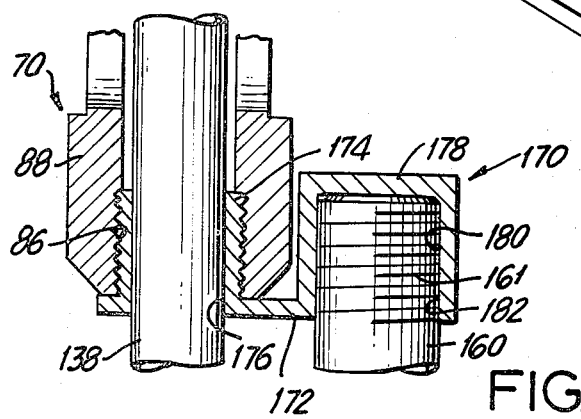
FIG. 12 is an elevational sectional view showing the interconnection of the connector of FIG. 11 with the pivot joint.

Alternately, the device heretofore shown in FIGS. 4–9 can be used even with a solid mounting post by utilizing a connector 170 formed as an adaptor, as shown in FIGS. 11 and 12. The connector 170 has a bottom plate 172 with two upwardly extending stubs. The first stub 174 is an externally threaded tubular stub having an internal passageway 176 which extends entirely through the base plate 172. The other stub forms a socket 178 internally threaded at 180, the socket 178 having a hole 182 extending through the base plate 172. The stub 174 threads into the internally threaded hole 86 formed in the bight section 88 of the clevis 70. The rod 138 can then pass through the inner opening 176 in the tubular stub 174. The solid mounting post 160 can have its upper threaded end 161 threaded into the socket 178 formed laterally adjacent to the tubular stub 174.

Utilizing the connector 170 shown in FIGS. 11 and 12, the regular pivot joint can be used both for tubular mounting posts as well as for solid mounting posts, and at the same time the rod can be positioned vertically with the rod extending downwardly from the joint for greater stability.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A pivot joint comprising:
   a housing member provided with a pair of opposing coaxially aligned bores and an elongated channel transverse to said bores and in communication with said bores;
   a cylindrical member rotatably positioned in said bores and extending across said channel, said cylindrical member being longitudinally split to provide a pair of clamping sections having a double-D configuration;
   a passageway extending through said cylindrical member transverse to its axis and spanning across the split to define opposing concave bearing surfaces for receiving an axially adjustable rod therethrough; and
   locking means extending into said housing member for locking said clamping sections together in a desired rotational orientation within said bores, thereby securely clamping the rod in a desired angular orientation and axial extension.

2. A pivot joint as in claim 1, and further comprising coupling means on said housing member for mounting onto a support post.

3. A pivot joint as in claim 2, wherein said locking means includes a threaded hole extending through a top portion of said housing member, and a single clamping screw threaded into said threaded hole and disposed against one of said clamping sections to permit adjustment of both the angular orientation and the axial extension of the rod.

4. A pivot joint as in claim 2, wherein said coupling means includes a threaded hole in a bottom portion of said housing member for receiving a threaded end of the support post.

5. A pivot joint as in claim 2, wherein said housing member is a unitary structure having four sides, a top and a bottom, said bores being provided through a first pair of opposing sides and said channel being defined by an elongated slot provided through the other pair of opposing sides, said coupling means being provided in said bottom, and said locking means being provided in said top.

6. A pivot joint as in claim 3, wherein said housing member includes a lower U-shaped clevis member and an upper U-shaped yoke member, and pivot means for pivotally coupling said yoke member onto said clevis member, whereby said yoke member can move out of axial alignment with respect to said clevis member to thereby permit the rod to be coaxially oriented with respect to said clevis member, and wherein said locking means also locks said yoke member with respect to said clevis member.

7. A pivot joint as in claim 6, wherein said channel is defined by a space between opposing legs of the clevis member so as to be open ended, and wherein said locking means is provided through a bight portion of said yoke member.

8. A pivot joint as in claim 6, wherein said coupling means includes a threaded hole provided through a lower bight portion of said clevis member to receive a threaded end of a hollow support post, whereby the rod can be coaxially positioned with respect to the support post and telescopically received therein.

9. A pivot joint as in claim 6, wherein said pivot means includes bearing plates disposed in said bores, inwardly directed pintels coaxially provided on said bearing plates, threaded holes provided in said pintels, clearance holes provided adjacent distal ends of the legs of said yoke member and aligned with said pintel threaded holes, pivot screws for passing through said clearance holes and threading into said pintel threaded holes, and axially directed sockets provided in opposing ends of said cylindrical member and spanning across said split for receiving said pintels, whereby said cylindrical member can rotate in said bores about said pintels, and said yoke member pivots about said pivot screws with respect to said clevis member.

10. A pivot joint as in claim 9, and further comprising raised bosses protruding from outer surfaces of the legs of the clevis member beneath said bores to provide limits for the pivotal movement of the yoke member.

11. A pivot joint as in claim 2, wherein said housing member has a clearance hole through a bottom portion thereof for passage of the rod therethrough, and wherein said coupling means includes an offset arm extending from said housing member, and a threaded hole provided in said offset arm for receiving a threaded end of the support post.

12. A pivot joint as in claim 4, and further comprising a connector having an externally threaded tubular stub for threading into said threaded hole in said bottom portion of said housing member to receive the rod therethrough, and a laterally spaced apart internally threaded socket for receiving the threaded end of the support post.

* * * * *